US011892682B2

(12) United States Patent
Fan et al.

(10) Patent No.: US 11,892,682 B2
(45) Date of Patent: Feb. 6, 2024

(54) DIFFRACTIVE OPTICAL WAVEGUIDE AND DISPLAY DEVICE HAVING THE SAME PRELIMINARY CLASS

(71) Applicant: JIAXING UPHOTON OPTOELECTRONICS TECHNOLOGY CO., LTD., Tongxiang (CN)

(72) Inventors: Zhentao Fan, Tongxiang (CN); Xingming Zhao, Tongxiang (CN); Kehan Tian, Tongxiang (CN)

(73) Assignee: JIAXING UPHOTON OPTOELECTRONICS TECHNOLOGY CO., LTD., Tongxiang (CN)

( * ) Notice: Subject to any disclaimer, the term of this patent is extended or adjusted under 35 U.S.C. 154(b) by 0 days.

(21) Appl. No.: 18/183,610

(22) Filed: Mar. 14, 2023

(65) Prior Publication Data

US 2023/0296845 A1 Sep. 21, 2023

(30) Foreign Application Priority Data

Mar. 15, 2022 (CN) .......................... 202210254157.1

(51) Int. Cl.
 *G02B 6/34* (2006.01)
(52) U.S. Cl.
 CPC ...................... *G02B 6/34* (2013.01)
(58) Field of Classification Search
 CPC ........................................................ G02B 6/34
 USPC .......................................................... 385/102
 See application file for complete search history.

(56) References Cited

U.S. PATENT DOCUMENTS

| | | | | |
|---|---|---|---|---|
| 5,504,772 A | * | 4/1996 | Deacon | H01S 3/108 |
| | | | | 372/102 |
| 7,102,700 B1 | * | 9/2006 | Pease | H04N 9/3129 |
| | | | | 348/E9.026 |
| 7,174,078 B2 | * | 2/2007 | Libori | G02B 6/0238 |
| | | | | 385/127 |
| 10,007,117 B2 | * | 6/2018 | Schultz | G02B 6/006 |
| 10,216,061 B2 | * | 2/2019 | Popovich | H01L 27/14625 |
| 10,591,756 B2 | * | 3/2020 | Popovich | G02B 26/0808 |

(Continued)

FOREIGN PATENT DOCUMENTS

WO 2018178626 A1 10/2018

*Primary Examiner* — Kaveh C Kianni
(74) *Attorney, Agent, or Firm* — HAUPTMAN HAM, LLP

(57) ABSTRACT

A diffractive optical waveguide and a display device having the same are disclosed, which waveguide comprises a grating structure formed on a surface of a waveguide substrate. The grating structure comprises a plurality of grating lines arranged in a plane, which extend along a first direction in the plane and are arranged at a predetermined interval in a second direction perpendicular to the first direction; at least one sidewall of each grating line has a periodic structure along the first direction; and the grating structure is configured to diffract light incident thereon at a non-zero angle with respect to the plane, out of the plane through a predetermined diffraction order. The grating structure in the diffractive optical waveguide can be used to adjust diffraction efficiency on different angles and/or diffraction orders, thereby providing a new effective and flexible means for improving angular uniformity and/or coupling-out efficiency of the waveguide.

19 Claims, 9 Drawing Sheets

(56) References Cited

U.S. PATENT DOCUMENTS

| | | | | |
|---|---|---|---|---|
| 10,690,916 B2* | 6/2020 | Popovich | | G02B 6/0035 |
| 10,895,671 B1* | 1/2021 | Calafiore | | G02B 27/0172 |
| 10,908,360 B2* | 2/2021 | Schultz | | G02B 27/4272 |
| 11,604,314 B2* | 3/2023 | Popovich | | G02B 27/286 |
| 2003/0179993 A1* | 9/2003 | Shigenaga | | G02B 6/32 |
| | | | | 385/33 |
| 2005/0281522 A1* | 12/2005 | Kim | | G02B 6/02328 |
| | | | | 385/125 |
| 2006/0093264 A1* | 5/2006 | Tabuchi | | G02B 6/3588 |
| | | | | 385/47 |
| 2010/0149073 A1* | 6/2010 | Chaum | | G02B 27/017 |
| | | | | 345/8 |
| 2011/0052129 A1* | 3/2011 | Sasaoka | | G02B 6/0365 |
| | | | | 385/126 |
| 2011/0286694 A1* | 11/2011 | Wu | | G02B 6/4214 |
| | | | | 385/14 |
| 2014/0104665 A1* | 4/2014 | Popovich | | G02B 27/0176 |
| | | | | 359/15 |
| 2014/0140654 A1* | 5/2014 | Brown | | G02B 27/4272 |
| | | | | 385/10 |
| 2017/0307887 A1* | 10/2017 | Stenberg | | G02B 26/0808 |
| 2017/0363871 A1* | 12/2017 | Vallius | | G02B 6/0016 |
| 2018/0059297 A1* | 3/2018 | Peroz | | G02B 6/0076 |
| 2018/0143438 A1* | 5/2018 | Oh | | G02B 6/0056 |
| 2018/0275350 A1* | 9/2018 | Oh | | G02B 27/0172 |
| 2019/0179177 A1* | 6/2019 | Rickman | | G02F 1/025 |
| 2019/0187474 A1* | 6/2019 | Bhargava | | G02B 27/0944 |
| 2019/0227321 A1* | 7/2019 | Lee | | G02B 27/0101 |
| 2020/0088932 A1* | 3/2020 | Schultz | | G02B 6/006 |
| 2020/0142120 A1* | 5/2020 | Meyer Timmerman Thijssen | | |
| | | | | G02B 6/0011 |
| 2020/0159023 A1* | 5/2020 | Bhargava | | G02B 27/4272 |
| 2020/0183152 A1* | 6/2020 | Pennell | | G02B 6/005 |
| 2020/0225479 A1* | 7/2020 | Chi | | G02F 1/011 |
| 2020/0264378 A1* | 8/2020 | Grant | | G02B 6/0016 |
| 2020/0341280 A1* | 10/2020 | Bablumyan | | G02B 5/32 |
| 2020/0400951 A1* | 12/2020 | Zhang | | G02B 6/0016 |
| 2020/0400955 A1* | 12/2020 | Messer | | G02B 6/0016 |
| 2020/0409145 A1* | 12/2020 | Bablumyan | | G02B 27/0103 |
| 2021/0033867 A1* | 2/2021 | Luo | | G02B 27/0176 |
| 2021/0055555 A1* | 2/2021 | Chi | | G02B 27/4205 |
| 2021/0072437 A1* | 3/2021 | Singh | | G02B 27/4272 |
| 2021/0096379 A1* | 4/2021 | Peroz | | G06T 19/006 |
| 2021/0191180 A1* | 6/2021 | Malhotra | | C08L 67/00 |
| 2021/0215941 A1* | 7/2021 | Schultz | | G02B 27/4272 |
| 2021/0231854 A1* | 7/2021 | Schultz | | G02B 5/32 |
| 2021/0302738 A1* | 9/2021 | Calafiore | | G02B 6/3596 |
| 2022/0075195 A1* | 3/2022 | Schultz | | G02B 6/29304 |
| 2022/0082739 A1* | 3/2022 | Franke | | G02B 27/0101 |
| 2022/0082936 A1* | 3/2022 | Franke | | G03F 7/0005 |
| 2022/0086419 A1* | 3/2022 | Qaderi | | G02B 5/1814 |
| 2022/0137411 A1* | 5/2022 | Lam | | G02B 5/1833 |
| | | | | 385/37 |
| 2022/0269075 A1* | 8/2022 | Yang | | G02B 27/0103 |
| 2022/0269076 A1* | 8/2022 | Yang | | G02B 27/102 |
| 2022/0283377 A1* | 9/2022 | Popovich | | G02B 6/0016 |
| 2022/0291437 A1* | 9/2022 | Lam | | G02B 6/0023 |
| 2022/0334302 A1* | 10/2022 | Zhang | | B05D 5/061 |
| 2022/0357579 A1* | 11/2022 | Drazic | | G02B 27/0172 |
| 2022/0373725 A1* | 11/2022 | Zhang | | B05D 7/546 |
| 2022/0390744 A1* | 12/2022 | Alasaarela | | G02B 27/0081 |
| 2023/0041380 A1* | 2/2023 | Lifschitz Arribio | | |
| | | | | G02B 6/0016 |
| 2023/0142054 A1* | 5/2023 | Qaderi | | G02B 30/40 |
| | | | | 359/23 |
| 2023/0185091 A1* | 6/2023 | He | | G02B 6/4213 |
| | | | | 385/147 |

* cited by examiner

DIFFRACTIVE OPTICAL WAVEGUIDE AND DISPLAY DEVICE HAVING THE SAME PRELIMINARY CLASS

FILED OF THE INVENTION

The present invention relates to diffraction-based display technology, in particular to a diffractive optical waveguide and a display device having the diffractive optical waveguide.

BACKGROUND

Diffraction-based display technology has developed rapidly in recent years, and it can be applied to display devices such as near-eye display devices, head-mounted display devices, and head-up display devices. A diffractive optical waveguide is an important optical device that can be used in diffraction display technology. FIG. 1 schematically illustrates a diffractive optical waveguide that can be used for display; FIG. 2 shows a cross-sectional view of the diffractive optical waveguide taken along the sectioning position shown in FIG. 1, and further illustrates the propagation of light in the diffractive optical waveguide. As shown in FIG. 1 and FIG. 2, a coupling-in grating b and a coupling-out grating c are arranged on a waveguide substrate a of the diffractive optical waveguide; the coupling-in grating b couples an incident light IN carrying image information into the waveguide substrate a; and the coupling-out grating b propagates and expands the light carrying image information, and at the same time couples the light out of the waveguide substrate to form a coupled-out optical field OUT. The eye E receives the light of the coupled-out optical field OUT so that an image carried by the incident light IN can be observed, for example.

Diffractive optical waveguide has the advantages of mass producibility, thinness, etc., but they are not without disadvantages. For example, its brightness and uniformity of displayed images still need to be improved.

In existing diffractive optical waveguide devices, a coupling-in grating generally adopts a straight-tooth grating (also referred to as a "rectangular grating"), and a +1st or −1st diffraction order is selected as a coupling-in diffraction order. However, the straight-tooth grating is a symmetrical structure. After light is coupled into the optical waveguide through it, the energy of the ±1st-order diffraction is evenly distributed, but only one of the orders is actually used, so the coupling efficiency of the coupling-in grating is low. If a blazed grating or oblique-tooth grating is used as the coupling-in grating, the diffraction energy can be concentrated to the +1st-order or −1st-order to improve the coupling efficiency, but the template processing of the blazed grating and oblique-tooth grating is relatively difficult, and the transfer printing and demoulding are also a great challenge. It is often difficult for actual products to meet the performance requirements of the design.

Furthermore, the uniformity of the coupled-out optical field of the diffractive optical waveguide includes the uniformity between different regions of the entire coupled-out optical field, as well as the uniformity (also known as "angular uniformity") between the different field of view angles (corresponding to the incident angle of the incident light IN on the coupling-in grating) within the field of view. People have been exploring how to improve the uniformity of the diffractive optical waveguide, and propose improvements to the optical unit structure of the two-dimensional coupling-out grating, see for example CN111194422A and CN212460098U. However, it is still difficult to control the fine and accurate shape (especially sharp-corners) and size of the optical unit structure of the two-dimensional grating during manufacturing; not only that but there are also great limitations in design.

SUMMARY

The object of the present invention is to provide a diffractive optical waveguide for diffraction-based display and a display device comprising the diffractive optical waveguide, so as to at least partly overcome the deficiencies in the prior art.

According to one aspect of the present invention, a diffractive optical waveguide, comprising a waveguide substrate and a grating structure formed on a surface of the waveguide substrate, wherein:

the grating structure comprises a plurality of grating lines arranged in a plane, the grating lines extend along a first direction in the plane and are arranged at a predetermined interval in a second direction perpendicular to the first direction;

each of the grating lines has a first sidewall and a second sidewall, which are opposite to each other in the second direction, at least one of the first sidewall and the second sidewall has a periodic structure along the first direction, and the periodic structure makes the grating structure as a whole asymmetrical on both sides in the second direction y;

the grating structure is configured to diffract light, which is incident thereon at a non-zero angle with respect to the plane, out of the plane through a predetermined diffraction order; and the diffractive optical waveguide comprises a coupling-in grating and a coupling-out grating formed on the waveguide substrate, wherein the grating structure is configured as the coupling-in grating, and the coupling-in grating couples a light beam irradiated on the waveguide substrate at an incident angle within a predetermined range into the waveguide substrate through the diffraction of the predetermined diffraction order so that it propagates in the waveguide substrate through total reflection, the first sidewall or the second sidewall formed with the periodic structure in the coupling-in grating faces in a direction, in which light of the predetermined diffraction order propagates to the coupling-out grating, and the periodic structures on the first sidewalls of different grating lines are aligned with each other in the second direction, and the coupling-out grating is configured to couple at least a portion of the light propagating from the coupling-in grating into it through total reflection out of the waveguide substrate by diffraction.

Advantageously, only the first sidewall has the periodic structure along the first direction.

Advantageously, wherein the first sidewall faces the coupling-out grating.

Advantageously, wherein the grating structure is further configured as the coupling-out grating.

Advantageously, only the first sidewall has a periodic structure along the first direction, and the periodic structures on the sidewalls of adjacent grating lines are staggered by a predetermined distance s along the first direction, s=P/n, wherein, P is a period of the periodic structure in the first direction, n is 2 or 3. Preferably, n is 2.

Advantageously, the coupling-out grating further comprises an additional grating structure, the additional grating structure is a one-dimensional grating, and in the coupling-out grating, the additional grating structure is arranged on at least one side of and abuts the grating structure in the first direction for coupling at least a portion of the light propagating thereinto out of the waveguide substrate by diffraction.

Advantageously, the periodic structure is formed as a plurality of protruding tooth-like structures, the tooth-like structure has a tooth top and tooth root, and the width of the tooth-like structure in the first direction gradually decreases from the tooth root to the tooth top.

Advantageously, the tooth-like structure has an axisymmetric structure with respect to an axis parallel to the second direction.

Advantageously, the tooth-like structure has a polygonal shape, a circular arc shape, or a shape formed by a combination of arcs and straight lines.

Advantageously, the tooth-like structure has a triangle shape, a trapezoid shape, or a circular arc shape.

Advantageously, the grating line is divided into a first region and a second region along the second direction, and the plurality of tooth-like structures are located in the second region; the grating line has different heights perpendicular to the plane and/or has different refractive indices in the first region and the second region.

Advantageously, the period of the periodic structure in the first direction is within 100-500 nm.

According to another aspect of the present invention, a display device is provided, which comprises the diffractive optical waveguide.

Advantageously, the display device is a near-eye display device and comprises a lens and a frame for holding the lens close to the eye, the lens comprising the diffraction optical guide.

According to embodiments of the invention, a diffractive optical waveguide adopts a novel grating structure, which can be used to adjust the diffraction efficiency at different angles and/or different diffraction orders, such that a new effective and flexible means is provided for improving the angular uniformity and/or coupling-out efficiency of the diffractive optical waveguide.

BRIEF DESCRIPTION OF THE DRAWINGS

Other features, objects, and advantages of the invention will become more apparent by reading the following detailed description of non-limitative embodiments with reference to the following drawings.

DETAILED DESCRIPTION

Figure 1:
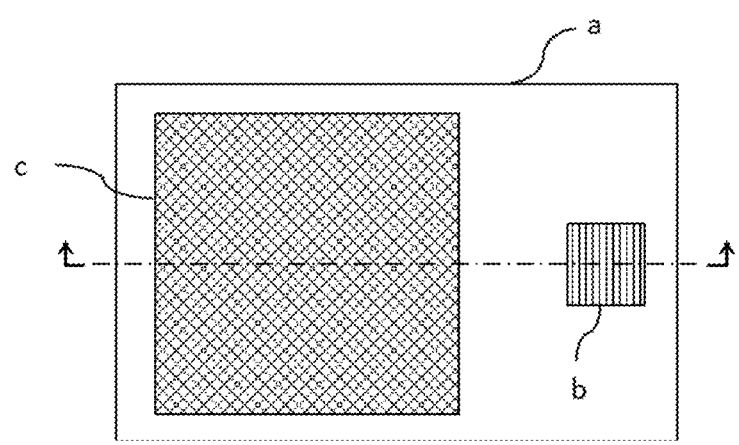
FIG. 1 is a schematic diagram of a diffractive optical waveguide that can be used for display.
Figure 2:
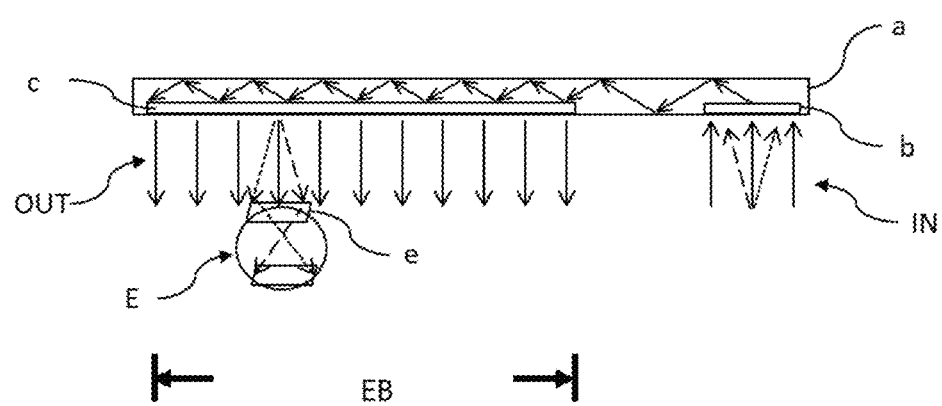
FIG. 2 is a schematic cross-sectional view of the diffractive optical waveguide shown in FIG. 1.

The invention will be further described in detail in conjunction with drawings and embodiments. It should be understood that the specific embodiments described herein are only used to explain the related invention, but not to limit the invention. In addition, it should be noted that, for the convenience of description, only the parts related to the invention are shown in the drawings. It should be noted that the embodiments in the present application and the features of the embodiments can be combined with each other without conflict.

A novel grating structure is adopted in diffractive optical waveguides according to the embodiment of the present invention. The grating structure is formed on a surface of a waveguide substrate and comprises a plurality of grating lines arranged in a plane, these grating lines extending along a first direction in the plane and arranged at predetermined intervals in a second direction perpendicular to the first direction, each grating line has a first sidewall and a second sidewall opposite to each other in the second direction, wherein at least one sidewall has a periodic structure in the first direction.

The inventors of the present invention have found that when the grating structure is used to diffract light incident thereon at a non-zero angle with respect to the plane where the grating structure is located, out of the plane through a predetermined diffraction order, these periodic structures formed on the sidewall can be used to adjust the diffraction efficiency at different incident angles and/or different diffraction orders, thereby a new effective and flexible means is provided for improving the uniformity (especially angular uniformity) and/or coupling efficiency of the diffractive optical waveguide.

The following describes a diffractive optical waveguide according to Embodiment 1 of the present invention, wherein the above-mentioned novel grating structure is used for coupling-in grating.

Figure 3:
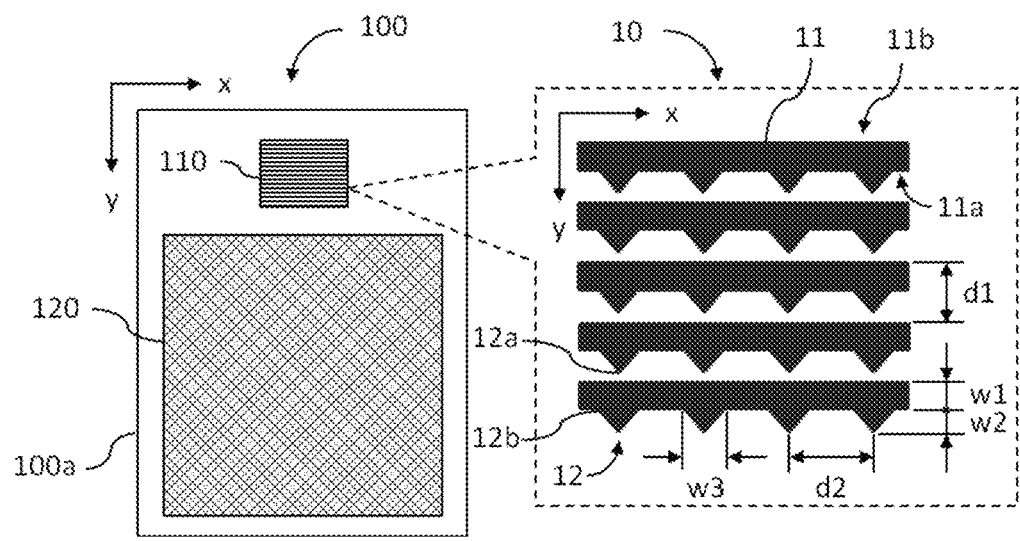
FIG. 3 is a schematic diagram of a diffractive optical waveguide according to Embodiment 1 of the present invention.

FIG. 3 shows an example of the diffractive optical waveguide according to Embodiment 1 of the present invention. As shown in FIG. 3, a diffractive optical waveguide 100 according to Embodiment 1 of the present invention comprises a waveguide substrate 100a and a coupling-in grating 110 formed on a surface of the waveguide substrate 100a. The coupling-in grating 110 comprises a grating structure 10, and the grating structure 10 is configured to couple a light beam irradiated thereon into the waveguide substrate 100a through the diffraction of the predetermined diffraction order so that the light propagates in the waveguide substrate 100a through total reflection.

The figure on the right side of FIG. 3 is an enlarged view of the grating structure 10. As shown in the figure, the grating structure 10 comprises a plurality of grating lines 11 arranged in the plane x-y, which extend along a first direction in the plane x-y and are arranged at a predetermined interval d1 in a second direction y perpendicular to the first direction x, and each gate line 11 has a first sidewall 11a and a second sidewall 11b opposite to each other in the second direction y. According to this embodiment, in the grating structure 10, the first sidewall 11a has a periodic structure 12 with a period d2 along the first direction x, and the periodic structures 12 on the first sidewalls 11a of different grating lines 11 are aligned with each other in the second direction y. Such a grating structure 10 can function as a one-dimensional grating.

As shown in FIG. 3, the diffractive optical waveguide 100 can further comprise a coupling-out grating 120 formed on the waveguide substrate 100a, and the coupling-out grating 120 is configured to couple at least a portion of the light propagating from the coupling-in grating 110 into it through total reflection, out of the waveguide substrate 100a by diffraction. Preferably, the first sidewall 11a formed with the periodic structure 12 faces the coupling-out grating 120.

In some implementations, the periodic structure 12 can form a plurality of protruding tooth-like structures, each tooth-like structure has a tooth top 12a and a tooth root 12b, and the width of the tooth-like structure in the first direction x gradually decreases from the tooth root 12b to the tooth top 12a. Advantageously, the periodic structure 12/tooth-like structure has an axisymmetric structure with respect to an axis (not shown) parallel to the second direction y, which helps to provide a corresponding symmetrical diffraction performance for the coupling-in grating 110.

Figure 4:
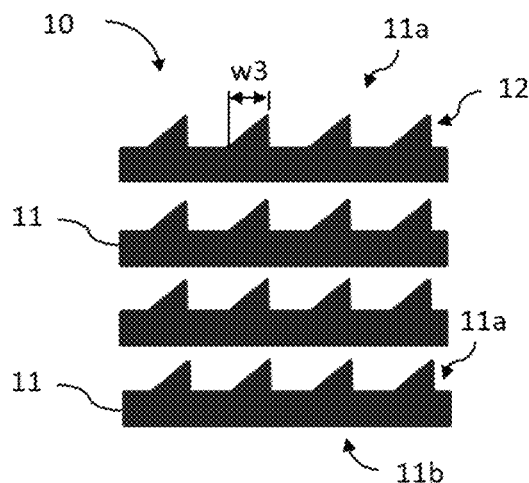
FIG. 4, FIG. 5, and FIG. 6 show different examples of optical gratings according to embodiments of the present invention, respectively.
Figure 5:
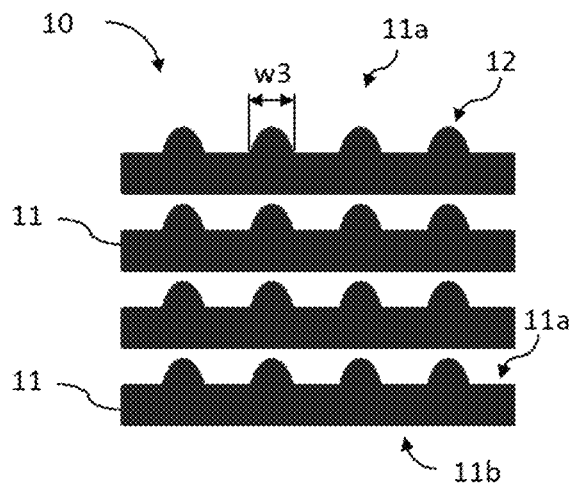
Figure 6:
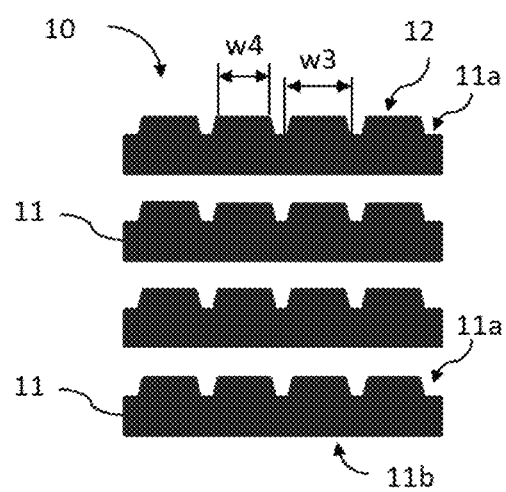

In the example shown in FIG. 3, the periodic structure 12 forms a tooth-like structures in the shape of a symmetrical triangle. However, what is shown in FIG. 3 is for illustrative purposes only, and is not limiting. FIGS. 4 to 6 show examples of grating structures in which the tooth-like structures have asymmetrical triangular, circular arc, and trapezoidal shapes. It should be understood that, as required in specific applications, the tooth-like structure can have a polygonal shape, a circular arc shape, or a shape formed by a combination of arcs and straight lines. As will be introduced in conjunction with data examples below, the diffraction efficiency of the grating structure 10 can be adjusted by adjusting the shape of the periodic structure 12.

In some other implementations, although not shown, the periodic structure 12 can be an undulating structure without a tooth-like structure forming obvious protrusions.

Figure 7:
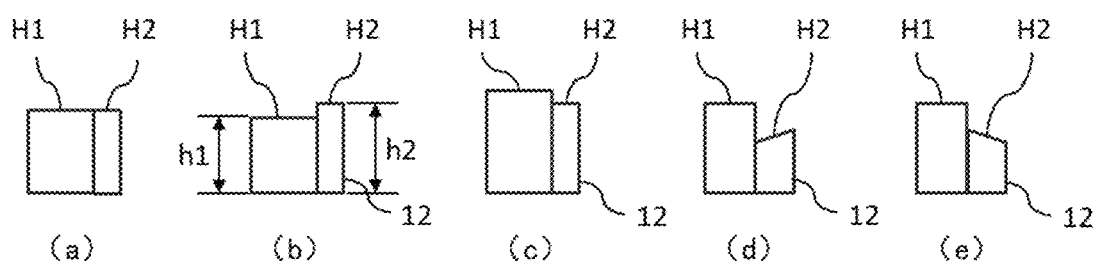
FIG. 7 is a schematic cross-sectional view of grating line of the grating structure along the second direction y.

FIG. 7 is a schematic cross-sectional view of the grating lines 11 of the grating structure 10 taken along the second direction y, wherein graphs (a), (b), (c), (d) and (e) show respectively different examples. As shown in FIG. 7, the grating line 11 can be divided into a first region H1 and a second region H2 along the second direction y. Here, the first region H1 mainly corresponds to the part of the grating line 11 extending continuously along the first direction x, which can be called a main body of the grating line; and the second region H2 is the region where the tooth-like structures (periodic structure 12) are located, which can comprise most or the whole of the tooth-like structures and can further comprise a part of the main body of the grating line.

Preferably, the first region H1 has a rectangular cross-section. In this case, the first regions H1 (the main body of the grating line) of the plurality of grating lines 11 in the grating structure 10 can be equivalent to a one-dimensional straight-tooth grating (also known as "rectangular grating"); and the periodic structures 12 are equivalent to an additional structure added on the basis of the straight-tooth grating. This additional structure can be used to make the originally symmetrical straight-tooth grating no longer symmetrical on both sides, i.e., the first sidewall 11a and the second sidewall 11b, and make the grating structure 10 as a whole asymmetrical on both sides in the second direction y. For example, in the diffractive optical waveguide 100 according to Embodiment 1 of the present invention, the periodic structure is only formed on the first sidewall 11a of the grating line 11. Using the straight-tooth grating as the main body of the grating structure 10 can effectively reduce the difficulty of grating manufacturing and processing, and can help to improve the yield rate and realize mass production.

According to embodiments of the present invention, the height of the periodic structure 12 can be adjusted to adjust the diffraction efficiency of the grating structure 10. In the example shown in graph (a) in FIG. 7, the first region H1 and the second region H2 have the same height. Such a structure is very beneficial to the processing and manufacturing of the grating, because the top of the grating structure 10 is flat, and the corresponding template processing, transfer printing, and demolding are relatively easy. Graphs (b) to (e) in FIG. 7 show different situations in which the height h1 of the first region H1 is different from the height h2 of the second region H2, wherein in graphs (b) and (c), the height of the second region H2 is the same and there is no inclination; in graphs (d) and (e), the second region H2 can have a gradient height. As will be introduced below, by setting the first region H1 and the second region H2 to have different heights h1 and h2, the diffraction energy can be effectively concentrated to the +1st-order or −1st-order, and the coupling efficiency can be greatly improved. In addition, compared with blazed grating and oblique-tooth grating, the above-mentioned grating structure has no inclination at the top or can be designed to have only a small and partial inclination, so template processing, transfer printing, and demolding are relatively easy, and it is beneficial for manufacturing and processing.

As an alternative or in addition, the grating line 11 can have different refractive indices in the first region H1 and the second region H2. Similar to the difference in height, the difference in refractive index will also affect the phase difference between the light in the first region H1 and the second region H2, which can be used to adjust the diffraction efficiency of the grating structure 10.

In the following, the affect of the periodic structure on the sidewall of the grating line in the above grating structure on the diffraction efficiency at different incident angles and/or different diffraction orders will be introduced by way of example and not limitation, combined with simulated data examples. The wavelength of the light used in the following data examples is 532 nm.

Data Example 1

In data example 1, the +1st-order diffraction efficiency of a straight-tooth grating with no periodic structure on the sidewalls of the grating lines is compared with that of gratings (grating structure 10) with periodic structures 12 with different shapes, and the grating lines of the compared gratings all have the same height, the material refractive indices of the gratings are 1.8, the grating period (that is, the arrangement interval of the grating lines 11 in the second direction) d1=450 nm, and the period of the periodic structure 12 d2=450 nm. See Table 1 for other parameters:

TABLE 1

|  | h1 | w1 | h2 | w2 | w3 | w4 |
| --- | --- | --- | --- | --- | --- | --- |
| Straight-tooth Grating | 300 nm | 315 nm | — | — | — | — |
| Symmetrical Triangle | 300 nm | 225 nm | 300 nm | 90 nm | 450 nm | — |
| Asymmetrical Triangle | 300 nm | 225 nm | 300 nm | 90 nm | 225 nm | — |
| Circular Arc Shape | 300 nm | 225 nm | 300 nm | 140 nm | 90 nm | — |
| Trapezoidal Shape | 300 nm | 225 nm | 300 nm | 90 nm | 450 nm | 167 nm |

Here, w1 is the width of the main body of the grating line 11 in the second direction y, w2 is the width of the periodic structure 12 in the second direction y, and w3 is the width of the tooth root 12b of the tooth-like structure formed by the periodic structure 12 in the first direction x, and w4 is the width of the tooth top 12a of the tooth-like structure formed by the periodic structure 12 in the first direction x (if the width is greater than 0). See FIG. 3 to FIG. 6 for details. The above parameters have the same meaning in the following data examples.

Figure 8:
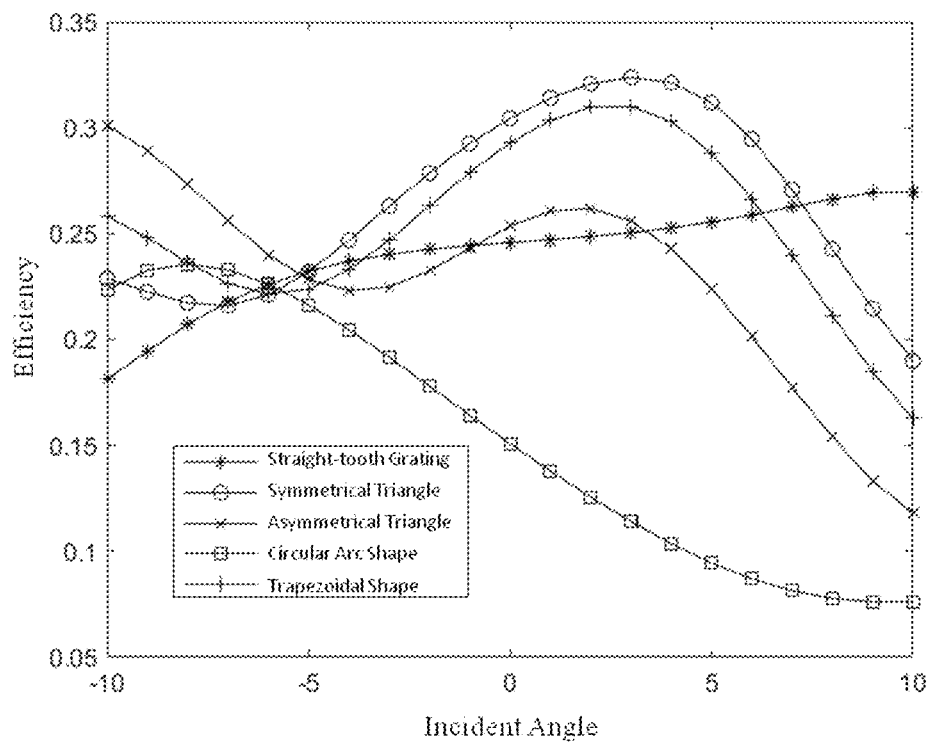
FIG. 8 is a graph of the +1st-order diffraction efficiency, which changes with incident angle, of a straight-tooth grating with no periodic structure on the sidewalls of the grating lines and of gratings with periodic structures of different shapes on the sidewalls of the grating lines in Data Example 1, wherein the grating lines have the same height.

FIG. 8 shows a graph of the +1st-order diffraction efficiency of each grating in Data Example 1 changed with the incident angle. In FIG. 8 and the graphs in FIG. 9 to FIG. 13 which will be discussed below, the incident angle is an included angle of the incident light relative to the normal line of the plane x-y where the grating (grating structure 10) is located, and in the corresponding data examples and graphs, only situation when the incident angle changes around an axis along the first direction x is considered and shown.

It can be seen from FIG. 8 that, compared with the straight-tooth grating, the periodic structures 12 on the sidewalls of the grating lines of the grating structure 10 can change the distribution of the +1st-order diffraction efficiency with respect to the incident angle, and the shape of the periodic structure 12 has a direct and significant influence on the distribution of the diffraction efficiency with respect to the incident angle.

Data Example 2

In data example 2, the +1st-order diffraction efficiency of gratings (grating structure 10) with the tooth-like periodic structures 12 having the same circular arc shape but different heights on the sidewalls of the grating lines are compared, in which the material refractive indices of the gratings are 1.8, the period of the gratings (that is, the arrangement interval of the grating lines 11 in the second direction) d1=450 nm, the period of the periodic structure 12 d2=450 nm. See Table 2 for other parameters:

TABLE 2

|  | h1 | w1 | h2 | w2 | w3 |
| --- | --- | --- | --- | --- | --- |
| Circular Arc Shape 0 | 300 nm | 225 nm | 300 nm | 140 nm | 90 nm |
| Circular Arc Shape 1 | 300 nm | 225 nm | 450 nm | 140 nm | 90 nm |
| Circular Arc Shape 2 | 300 nm | 225 nm | 375 nm | 140 nm | 90 nm |

Figure 9:
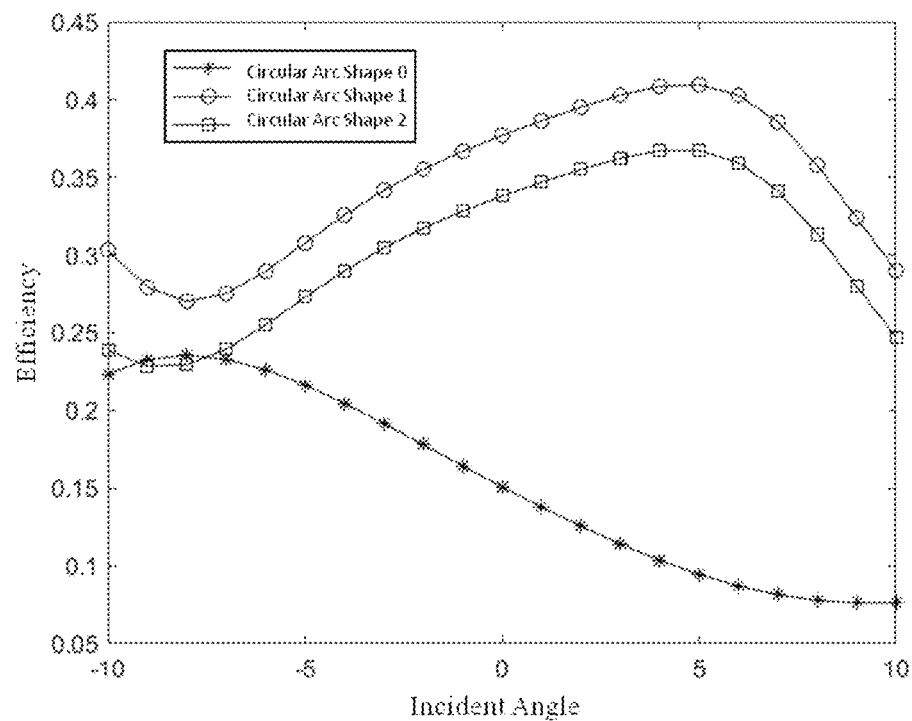
FIG. 9 is a graph of the +1st-order diffraction efficiency, which changes with incident angle, of gratings with circular arc shape tooth-like periodic structures with different heights on the sidewalls of the grating lines in Data Example 2.

FIG. 9 shows a graph of the +1st-order diffraction efficiency of each grating in Data Example 2, which changes with the incident angle. It can be seen from FIG. 9 that the height of the periodic structure 12 can significantly affect the distribution of the +1st-order diffraction efficiency of the grating with the incident angle. By optimizing the height of the periodic structure 12, the overall +1st-order diffraction efficiency can be greatly improved. See the change of the curves for "Circular Arc Shape 1" and "Circular Arc Shape 2" relative to the curve for "Circular Arc Shape 0".

Data Example 3

In data example 3, the +1st-order diffraction efficiency of a straight-tooth grating with no periodic structure on the sidewalls of the grating lines is compared with that of gratings with periodic structures having different shapes and different heights on the sidewalls of the grating lines, and the height of the periodic structure in the compared grating is different from that of the other parts of the grating line, the material refractive indices of the gratings are 1.8, the grating period (that is, the arrangement interval of the grating lines 11 in the second direction) d1=450 nm, and the period of periodic structure 12 d2=450 nm. See Table 3 for other parameters:

TABLE 3

|  | h1 | w1 | h2 | w2 | w3 | w4 |
|---|---|---|---|---|---|---|
| Straight-tooth Grating | 300 nm | 315 nm | — | — | — | — |
| Symmetrical Triangle | 300 nm | 225 nm | 450 nm | 90 nm | 450 nm | — |
| Asymmetrical Triangle | 300 nm | 225 nm | 450 nm | 90 nm | 225 nm | — |
| Circular Arc Shape | 300 nm | 225 nm | 450 nm | 140 nm | 90 nm | — |
| Trapezoidal Shape | 300 nm | 225 nm | 450 nm | 90 nm | 450 nm | 167 nm |

Figure 10:
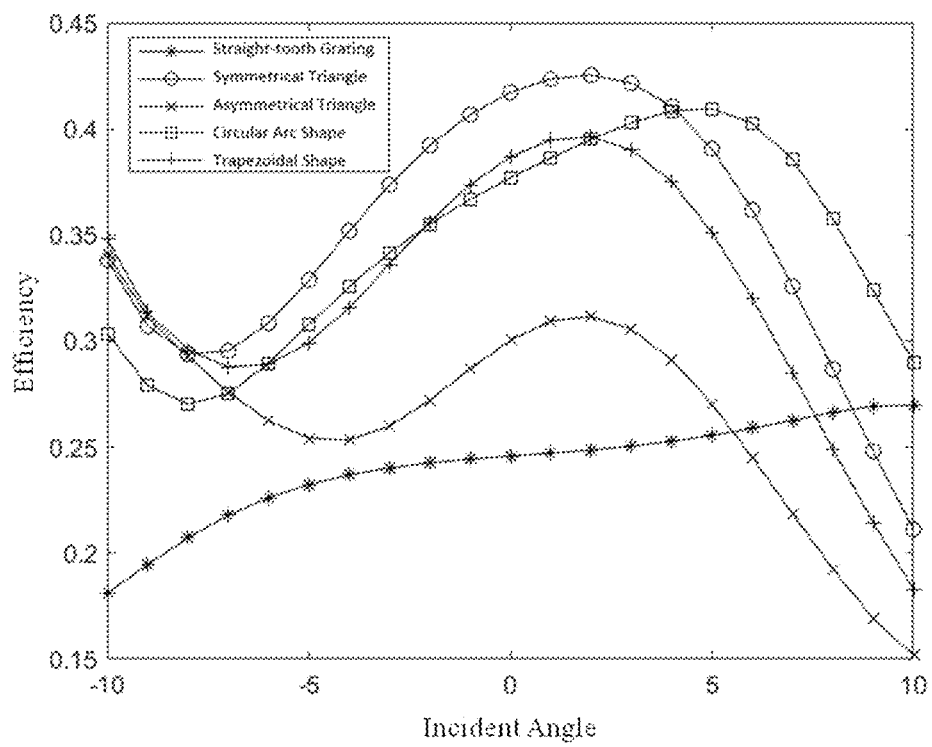
FIG. 10 is a graph of the +1st-order diffraction efficiency, which changes with incident angle, of a straight-tooth grating with no periodic structure on the sidewalls of the grating lines and gratings with periodic structures with different shapes on the sidewalls of the grating lines in Data Example 3, wherein the periodic structure and other parts of a grating line have different heights.

FIG. 10 shows a curve graph of the +1st-order diffraction efficiency of each grating, which changes with the incident angle. It can be seen from FIG. 10 that by changing/optimizing the shape and height of the periodic structure 12, the +1st-order diffraction efficiency of the grating can be improved as a whole, and the distribution of the diffraction efficiency with respect to the incident angle can be adjusted.

Data Example 4

In the above data examples 1-3, diffraction efficiency has been analyzed and compared separately for the grating structure 10, and in data example 4, the diffractive optical waveguide 100 according to Embodiment 1 of the invention will be investigated as a whole.

In data example 4, it is assumed that the coupling-in grating 110 of the diffractive optical waveguide 100 adopts respective gratings analyzed in data example 3, which have the structural parameters and the graph of the diffraction efficiency changing with the incident angle shown in Table 3 and FIG. 10; and the +1st-order of the coupling-in grating 110 is used as the predetermined diffraction order for coupling the incident light into the waveguide substrate and making the light propagate toward the coupling-out grating 120.

Figure 11:
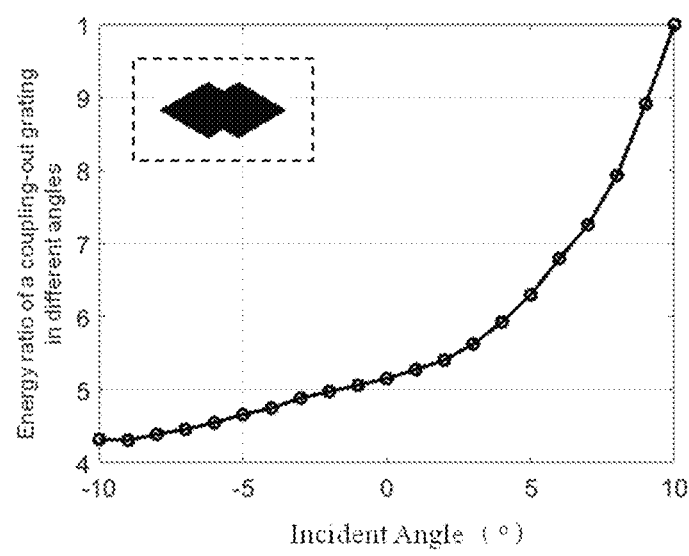
FIG. 11 is a graph of coupled-out energy, which changes with incident angle, of a coupling-out grating in Data Example 4.

At the same time, in Data Example 4, it is assumed that the coupling-out grating 120 of the diffractive optical waveguide 100 is a two-dimensional grating, and the cross-section of the optical unit structure of the two-dimensional grating is an improved parallelogram as shown in the upper left corner of FIG. 11, wherein the vertex angles at two ends of the improved parallelogram are 60°, the four vertex angles in the middle are all 120°, the length of the four long sides on both sides is 248 nm, and the length of the four short sides in the middle is 47 nm. The coupling-out grating 120 with the improved parallelogram optical unit structure is a grating structure that has been proposed in the prior art, which has the effect of weakening the middle bright strip of the coupled-out optical field and helps to improve the uniformity between different regions of the coupled-out optical field coupling. However, referring to the graph (the ordinate is a normalized value, and it is assumed that the optical energy coupled into the coupling-out grating is uniformly distributed with the incident angle) of the coupled-out energy of the coupling-out grating 120 which changes with the incident angle shown in FIG. 11, it can be seen that this "improved parallelogram" shape optical unit structure cannot improve the angular uniformity of the coupled-out optical field at the same time. On the contrary, as the incident angle changes, the coupled-out energy (coupling-out efficiency) changes greatly.

Figure 12:
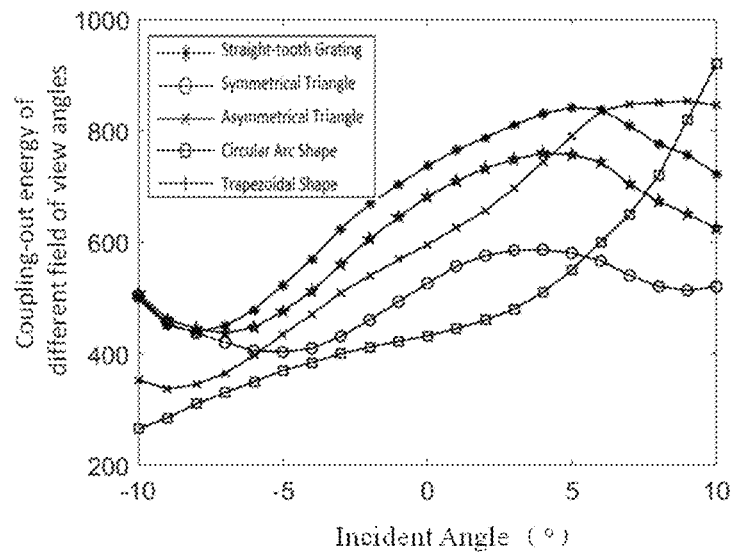
FIG. 12 is a graph of coupled-out energy, which changes with incident angle, of the diffractive optical waveguide in Data Example 4, wherein the diffractive optical waveguide uses each grating in Data Example 3 as a coupling-in grating and is configured with a coupling-out grating with a graph of coupled-out energy changed with the incident angle as shown in FIG. 11.

FIG. 12 is a curve graph of coupled-out energy of the diffractive optical waveguide 100 having the above-mentioned coupling-in grating 110 and coupling-out grating 120 which changes with the incident angle. The change of the overall coupled-out optical energy of the diffractive optical waveguide 100 along with the incident angle is affected by both the +1st-order diffraction efficiency of the coupling-in grating 110 and the coupling-out efficiency of the coupling-out grating 120. As can be seen from FIG. 12 that compared with the coupling-in grating in the form of a straight-tooth grating, the overall coupling-out efficiency within the field of view (FOV) range of the diffractive optical waveguide 100 is significantly improved and the uniformity within the FOV is also significantly improved after the coupled-out grating 120 is matched with the coupled-in grating 110 with the periodic structures on the sidewalls of the grating lines. In the examples shown in FIG. 12, the diffractive optical waveguide whose periodic structure is a triangular tooth structure has the greatest efficiency, and the diffractive optical waveguide whose periodic structure is an asymmetric triangular structure has the best uniformity within FOV.

It should be understood that the above coupling-out grating with the improved parallelogram optical unit structure is only exemplary. According to Embodiment 1 of the present invention, in a specific application, the specific parameters of the periodic structure 12 in the coupling-in grating 110 can be adjusted according to the specific situation of the coupling-out grating 120 to be used together, so as to adjust the diffraction efficiency of the coupling-in diffraction order (for example, +1st-order or −1st-order) of the coupling-in grating 110, in such a way that when it is used with the specific coupling-out grating 120, the distribution of the optical energy of the overall coupled-out optical field tends to be uniform over FOV. Compared with improving the uniformity of the coupled-out optical field simply by designing the optical structure of the coupling-out grating, the diffractive optical waveguide 100 according to Embodiment 1 of the present invention provides an additional, effective, and flexible means to improve the angular uniformity of the coupled-out optical field by adopting a novel grating structure 10 in the coupling-in grating 110.

Data Example 5

Figure 13:
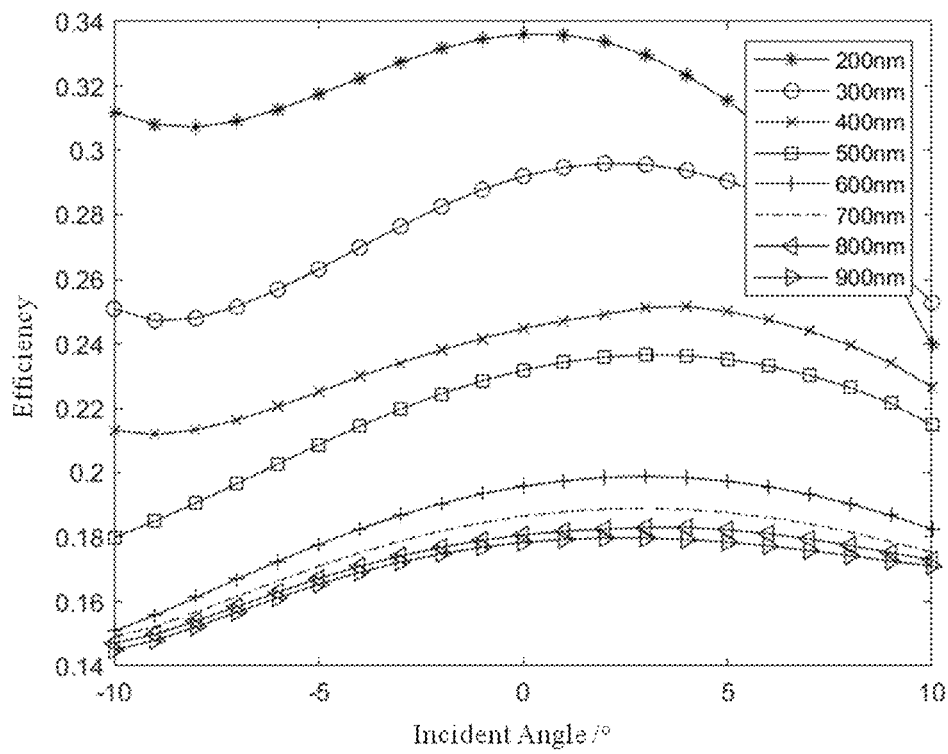
FIG. 13 is a graph of the +1st-order diffraction efficiency, which changes with incident angle, of gratings with circular arc shape tooth-like periodic structures with different periods on the sidewalls of the grating lines in Data Example 5.

In data example 5, the +1st-order diffraction efficiencies of gratings with tooth-like periodic structures having different periods and the same circular arc shape on the sidewalls of the grating lines are compared, with the material refractive index of each grating is 1.8, the grating period (that is, the arrangement interval of the grating lines 11 in the second direction) d1=450 nm, and the period d2 of the periodic structure 12 is marked in the graph of FIG. 13. As can be seen from FIG. 13, the smaller the period d2 of the periodic structure is, the higher the +1st-order diffraction efficiency of the grating.

According to the embodiment of the invention, the period d2 of the periodic structure 12 in the grating structure 10 is preferably less than 600 nm; and considering the processability, the period d2 is preferably greater than 100 nm. More preferably, the period d2 of the periodic structure is between 100 nm and 500 nm.

Figure 14:
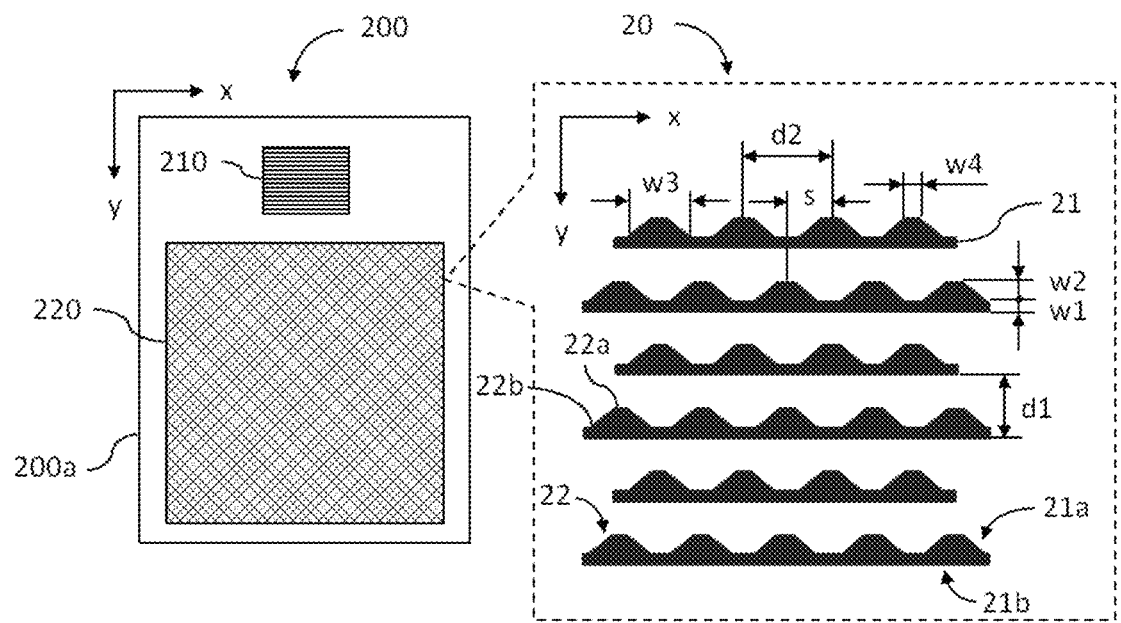
FIG. 14 is a schematic diagram of a diffractive optical waveguide according to Embodiment 2 of the present invention.
Figure 15:
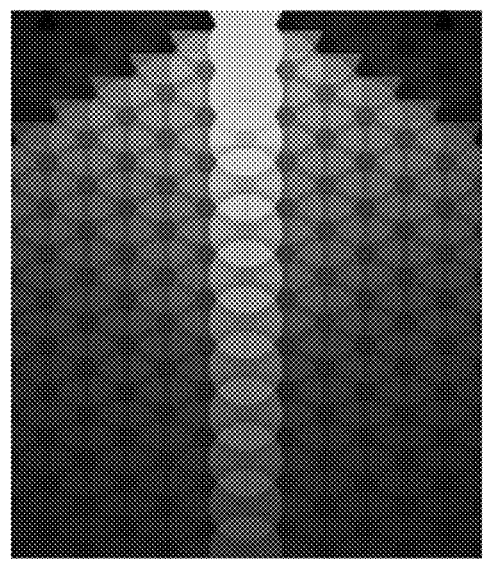
FIG. 15 is an energy distribution diagram of coupled-out optical field of the 0° field of view of a diffractive optical waveguide obtained by the simulation in Data Example 6.

Next, a diffractive optical waveguide according to Embodiment 2 of the present invention will be introduced with reference to FIG. 14 and FIG. 15, in which a novel grating structure is used for a coupling-out grating of the diffractive optical waveguide.

FIG. 14 shows an example of a diffractive optical waveguide according to Embodiment 2 of the present invention. As shown in FIG. 14, a diffractive optical waveguide 200 according to Embodiment 2 of the present invention comprises a waveguide substrate 200a and a coupling-out grating 220 formed on a surface of the waveguide substrate 200a. The coupling-out grating 220 comprises a grating structure 20, and the grating structure 20 is configured to couple at least a portion of light propagating thereinto through total reflection within the waveguide substrate 200a out of the waveguide substrate 200a by diffraction.

The figure on the right side of FIG. 14 is an enlarged view of the grating structure 20. As shown in the figure, the grating structure 20 comprises a plurality of grating lines 21 arranged in the plane x-y, which extend along the first direction x in the plane x-y and are arranged at a predetermined interval d1 in a second direction y perpendicular to the first direction x, and each grating line 21 has a first sidewall 21a and a second sidewall 21b opposite to each other in the second direction y. According to this embodiment, the first sidewall 21a has a periodic structure 22 with a period of d2 along the first direction x, and the periodic structures 22 on the sidewalls of the adjacent gate lines 21 are staggered by a predetermined distance s=d2/n along the first direction x, wherein n is 2 or 3. In a preferred example shown in FIG. 14, n is 2.

As shown in FIG. 14, the diffractive optical waveguide 200 can further comprise a coupling-in grating 210 formed on the waveguide substrate 200a, and the coupling-in grating is configured to couple a light beam irradiated on it into the waveguide substrate 200a so that the light propagates in the waveguide substrate 200a through total reflection. Preferably, in the optical structure, the first sidewall 21a of a grating lines 21 faces the coupling-in grating 210, so that the periodic structure 22 faces the coupling-in region, which can reduce coupling-out in the central line region of the coupling-out grating 220, expand the energy to both sides, and thus improve the uniformity.

In some embodiments, the periodic structure 22 can form a plurality of protruding tooth-like structures, each of which has a tooth top 22a and a tooth root 22b, and the width of the tooth-like structure in the first direction x gradually decreases from the tooth root 22b to the tooth top 22a. Advantageously, the periodic structure 22/tooth-like structure has an axisymmetric structure with respect to an axis (not shown) parallel to the second direction y, which helps to provide a corresponding symmetrical diffraction performance for the coupling-out grating 220.

In the example shown in FIG. 14, the periodic structure 22 forms trapezoidal tooth-like structures. However, the tooth-like structure formed by the periodic structure 22 can also have structures such as of triangular, circular arc, and trapezoidal shapes; more generally, it can have a polygonal shape, a circular arc shape, or a shape formed by a combination of arcs and straight lines according to the needs of specific applications.

In some other implementations, although not shown, the periodic structure 22 can be an undulating structure without a tooth-like structure forming obvious protrusions.

In addition, the grating line 21 can be divided into a first region H1 and a second region H2 along the second direction y (refer to FIG. 7), wherein the second region H2 is the region where the tooth-like structure (periodic structure 22) is located, and they have the same or different heights and/or refractive indices in the first region H1 and the second region H2. Preferably, the first region H1 has a rectangular cross-section.

Data Example 6

In data example 6, the coupled-out optical field of the diffractive optical waveguide 200 with the grating structure 20 as the coupling-out grating 220 is simulated and calculated, with the material refractive index of the grating being 1.8, the grating period (that is, the arrangement interval of the grating lines 21 in the second direction y) d1=450 nm, and the period of periodic structure 22 d2=450 nm. See Table 4 for other parameters:

TABLE 4

|  | h1 | w1 | h2 | w2 | w3 | w4 |
|---|---|---|---|---|---|---|
| Trapezoidal Shape | 300 nm | 225 nm | 450 nm | 90 nm | 450 nm | 167 nm |

FIG. 15 is an energy distribution diagram of the coupled-out optical field of a diffractive optical waveguide obtained by simulation in data example 6. It can be seen from FIG. 15 that the grating structure 20 can function as a two-dimensional grating, and can realize two-dimensional pupil expansion when used as a coupling-out grating.

Figure 16:
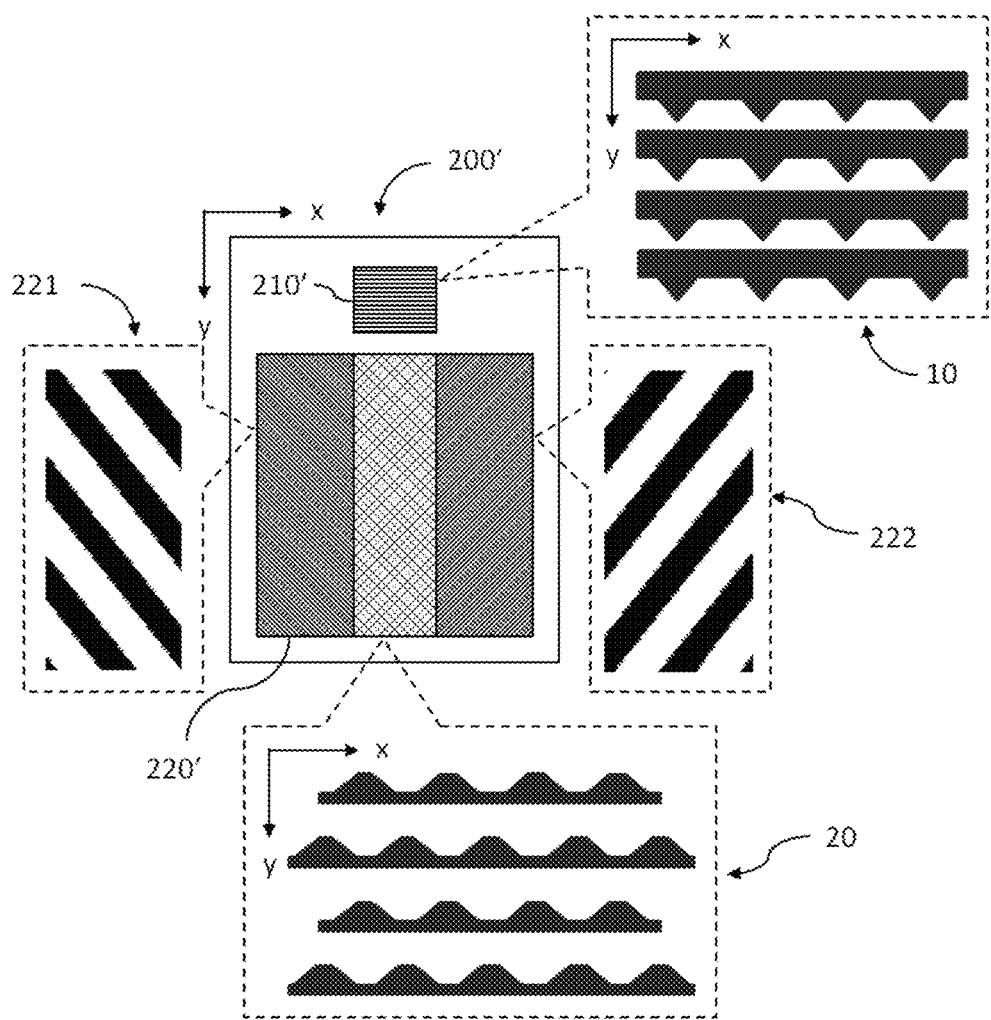
FIG. 16 is a schematic diagram of a diffractive optical waveguide according to Embodiment 3 of the present invention.

FIG. 16 is a schematic diagram of a diffractive optical waveguide according to Embodiment 3 of the present invention. As shown in FIG. 16, the diffractive optical waveguide 200' according to Embodiment 3 of the present invention has substantively the same structure as the diffractive optical waveguide 200 according to Embodiment 2, and the main difference between them lies in that: a coupling-out grating 220' in the diffractive optical waveguide 200' further comprises additional grating structures 221 and 222 in addition to the grating structure 20, and the additional grating structures 221 and 222 are one-dimensional grating, and are arranged on both sides of and abut the grating structure 20 in the first direction x, for coupling at least a portion of the light propagating thereinto out of the waveguide substrate through diffraction. Since the diffraction efficiency of a one-dimensional grating is generally higher than that of a two-dimensional grating, the additional grating structures 221 and 222 help to improve the coupling-out efficiency of the whole coupling-out grating 220', and also help to improve the brightness of the two sides of the coupled-out optical field, thus improving the uniformity.

Advantageously, as shown in FIG. 16, a coupling-in grating 210' of the diffractive optical waveguide 200' can also adopt the novel grating structure 10. The grating structure 10 here can be the same or similar to the grating structure 10 used in the diffractive optical waveguide 100 according to Embodiment 1 of the present invention, and will not be described here for clarity and conciseness.

In the diffractive optical waveguide according to the embodiment of the present invention described above, the periodic structures 12, 22 in the grating structures 10, 20 are only formed on one sidewall of the grating lines 11, 21.

Figure 17:
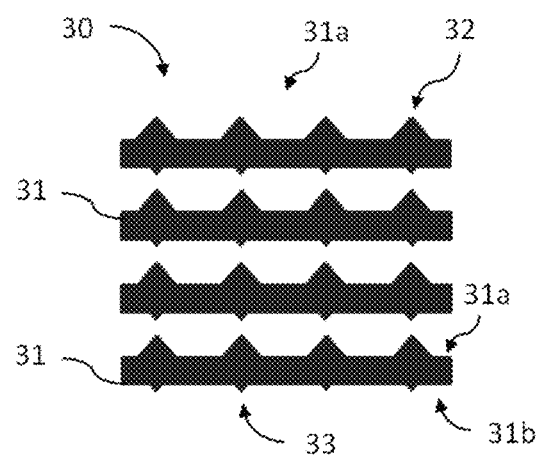
FIG. 17, FIG. 18, and FIG. 19 show respectively different examples of optical gratings according to other embodiments of the present invention, wherein both sidewalls of a grating line of a grating are formed with periodic structures.
Figure 18:
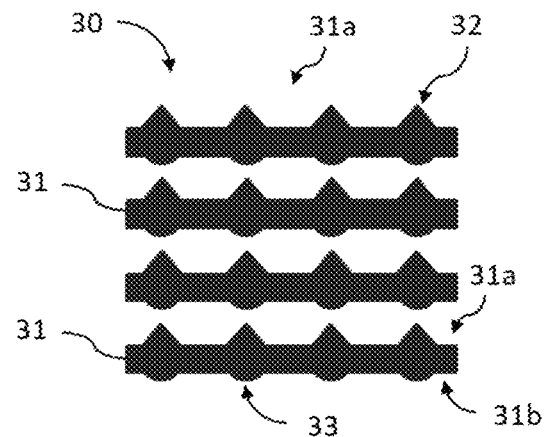
Figure 19:
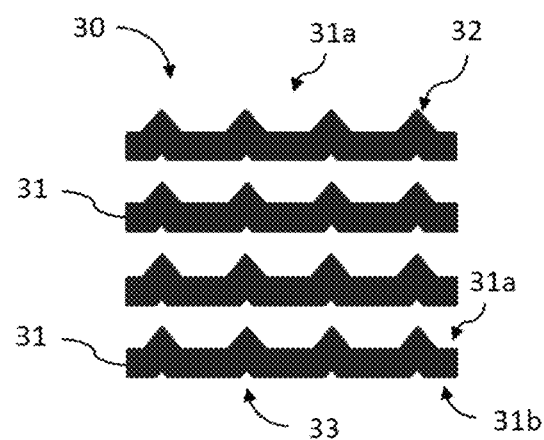

However, the present invention is not limited thereto. FIGS. 17, 18, and 19 respectively show different examples of grating structures 30 that can be used in diffractive optical waveguides according to other embodiments of the present invention, in which both sidewalls 31a and 31b of a grating line 31 of the grating structure 30 are formed with periodic structures. Specifically, the first sidewall 31a of the grating line 31 has a first periodic structure 32 along the first direction, and the second sidewall 31b has a second periodic structure 33 along the first direction. Advantageously, the first periodic structure 32 and the second periodic structure 33 can have different structures (such as shape, size, position, etc.) so that the grating structure 30 as a whole presents asymmetry in the direction perpendicular to the grating line 31 (that is, in the second direction y).

The diffractive optical waveguide according to the embodiment of the present invention can be applied in a display device. Such a display device is, for example, a near-eye display device, which comprises a lens and a frame for holding the lens close to the eye, wherein the lens can comprise the diffractive optical waveguide according to an embodiment of the present invention as described above. Preferably, the display device can be an augmented reality display device or a virtual reality display device.

As discussed above with reference to the illustration of the figures, the followings are provided in this application:

(1) A diffractive optical waveguide, comprising a waveguide substrate and a grating structure formed on a surface of the waveguide substrate, wherein,
the grating structure comprises a plurality of grating lines arranged in a plane, the grating lines extend along a first direction in the plane and are arranged at a predetermined interval in a second direction perpendicular to the first direction;
each of the grating lines has a first sidewall and a second sidewall, which are opposite to each other in the second direction, at least one of the first sidewall and the second sidewall has a periodic structure along the first direction; and
the grating structure is configured to diffract light, which is incident thereon at a non-zero angle with respect to the plane, out of the plane through a predetermined diffraction order.

(2) The diffractive optical waveguide of item (1), wherein the grating structure is configured as a coupling-in grating, and the coupling-in grating couples a light beam irradiated on the waveguide substrate at an incident angle within a predetermined range into the waveguide substrate through the diffraction of the predetermined diffraction order so that it propagates in the waveguide substrate through total reflection.

(3) The diffractive optical waveguide of item (2), wherein only the first sidewall has a periodic structure along the first direction, and the periodic structures on the first sidewalls of different grating lines are aligned with each other in the second direction.

(4) The diffractive optical waveguide of item (2) or (3), further comprising a coupling-out grating formed on the waveguide substrate, and the coupling-out grating is configured to couple at least a portion of the light propagating from the coupling-in grating into it through total reflection out of the waveguide substrate by diffraction; and the first sidewall faces the coupling-out grating.

(5) The diffractive optical waveguide of item (1), wherein the grating structure is configured as a coupling-out grating, and the coupling-out grating couples at least a portion of the light propagating thereinto through total reflection within the waveguide substrate, out of the waveguide substrate by diffraction.

(6) The diffractive optical waveguide of item (5), wherein only the first sidewall has a periodic structure along the first direction, and the periodic structures on the sidewalls of adjacent grating lines are staggered by a predetermined distance s along the first direction, s=P/n, wherein, P is a period of the periodic structure in the first direction, n is 2 or 3, preferably n is 2.

(7) The diffractive optical waveguide of item (6), further comprising an additional grating structure, the additional grating structure is a one-dimensional grating, which is arranged on at least one side of and abuts the grating structure in the first direction for coupling at least a portion of the light propagating thereinto out of the waveguide substrate by diffraction.

(8) The diffractive optical waveguide of any one of items (5)-(7), further comprising a coupling-in grating formed on the waveguide substrate, the coupling-in grating is configured to couple a light beam irradiated on the waveguide substrate into the waveguide substrate so that it propagates in the waveguide substrate through total reflection, and the first sidewall faces the coupling-in grating.

(9) The diffractive optical waveguide of any one of items (1)-(8), wherein the periodic structure is formed as a plurality of protruding tooth-like structures, the tooth-like structure has a tooth top and tooth root, and the width of the tooth-like structure in the first direction gradually decreases from the tooth root to the tooth top.

(10) The diffractive optical waveguide of item (9), wherein the tooth-like structure has an axisymmetric structure with respect to an axis parallel to the second direction.

(11) The diffractive optical waveguide of item (9), wherein the tooth-like structure has a polygonal shape, a circular arc shape, or a shape formed by a combination of arcs and straight lines, preferably, the tooth-like structure has a triangle shape, a trapezoid shape, or a circular arc shape.

(12) The diffractive optical waveguide of any one of items (9)-(11), wherein the grating line is divided into a first region and a second region along the second direction, and the plurality of tooth-like structures are located in the second region; the grating line has different heights perpendicular to the plane and/or has different refractive indices in the first region and the second region.

(13) The diffractive optical waveguide of any one of items (1)-(8), wherein the period of the periodic structure in the first direction is within 100-500 nm.

(14) A display device, comprising the diffractive optical waveguide of any one of items (1)-(13).

(15) The display device of item (14), wherein the display device is a near-eye display device and comprises a lens and a frame for holding the lens close to the eye, the lens comprising the diffraction optical guide.

(16) The display device of item (14) or (15), wherein the display device is an augmented reality display device or a virtual reality display device.

The above description is merely an illustration of the preferred embodiments of the present application and the applied technical principles. Those skilled in the art should understand that the scope of the invention involved in the present application is not limited to the technical solution formed by the specific combination of the above technical features, but also covers other technical solutions formed by any combination of the above technical features or their equivalent features without departing from the inventive concept. For example, the technical solution is formed by replacing the above features with (but not limited to) the technical features with similar functions disclosed in the present application.

What is claimed is:

1. A diffractive optical waveguide, comprising a waveguide substrate and a grating structure formed on a surface of the waveguide substrate, wherein,
the grating structure comprises a plurality of grating lines arranged in a plane, the grating lines extend along a first direction in the plane and are arranged at a predetermined interval in a second direction perpendicular to the first direction;
each of the grating lines has a first sidewall and a second sidewall, which are opposite to each other in the second direction, at least one of the first sidewall and the second sidewall has a periodic structure along the first direction, and the periodic structure makes the grating structure as a whole asymmetrical on both sides in the second direction;
the grating structure is configured to diffract light, which is incident thereon at a non-zero angle with respect to the plane, out of the plane through a predetermined diffraction order; and
the diffractive optical waveguide comprises a coupling-in grating and a coupling-out grating formed on the waveguide substrate, wherein the grating structure is configured as the coupling-in grating, and the coupling-in grating couples a light beam irradiated on the waveguide substrate at an incident angle within a predetermined range into the waveguide substrate through the diffraction of the predetermined diffraction order so that it propagates in the waveguide substrate through total reflection, the first sidewall or the second sidewall formed with the periodic structure in the coupling-in grating faces in a direction, in which light of the predetermined diffraction order propagates to the coupling-out grating, the periodic structures on the first sidewalls of different grating lines are aligned with each other in the second direction, and the coupling-out grating is configured to couple at least a portion of the light propagating from the coupling-in grating into it through total reflection out of the waveguide substrate by diffraction.

2. The diffractive optical waveguide of claim 1, wherein only the first sidewall has the periodic structure along the first direction.

3. The diffractive optical waveguide of claim 1, wherein the first sidewall faces the coupling-out grating.

4. The diffractive optical waveguide of claim 1, wherein the grating structure is further configured as the coupling-out grating.

5. The diffractive optical waveguide of claim 4, wherein only the first sidewall has a periodic structure along the first direction, and the periodic structures on the sidewalls of adjacent grating lines are staggered by a predetermined distance s along the first direction, s=P/n, wherein, P is a period of the periodic structure in the first direction, n is 2 or 3.

6. The diffractive optical waveguide of claim 5, wherein n is 2.

7. The diffractive optical waveguide of claim 5, wherein the coupling-out grating further comprises an additional grating structure, the additional grating structure is a one-dimensional grating, and in the coupling-out grating, the additional grating structure is arranged on at least one side of and abuts the grating structure in the first direction for coupling at least a portion of the light propagating thereinto out of the waveguide substrate by diffraction.

8. The diffractive optical waveguide of claim 1, wherein the periodic structure is formed as a plurality of protruding tooth-like structures, the tooth-like structure has a tooth top and tooth root, and the width of the tooth-like structure in the first direction gradually decreases from the tooth root to the tooth top.

9. The diffractive optical waveguide of claim 5, wherein the periodic structure is formed as a plurality of protruding tooth-like structures, the tooth-like structure has a tooth top and tooth root, and the width of the tooth-like structure in the first direction gradually decreases from the tooth root to the tooth top.

10. The diffractive optical waveguide of claim 8, wherein the tooth-like structure has an axisymmetric structure with respect to an axis parallel to the second direction.

11. The diffractive optical waveguide of claim 8, wherein the tooth-like structure has a polygonal shape, a circular arc shape, or a shape formed by a combination of arcs and straight lines.

12. The diffractive optical waveguide of claim 11, wherein the tooth-like structure has a triangle shape, a trapezoid shape, or a circular arc shape.

13. The diffractive optical waveguide of claim 8, wherein the grating line is divided into a first region and a second region along the second direction, and the plurality of tooth-like structures are located in the second region; the grating line has different heights perpendicular to the plane and/or has different refractive indices in the first region and the second region.

14. The diffractive optical waveguide of claim 9, wherein the grating line is divided into a first region and a second region along the second direction, and the plurality of tooth-like structures are located in the second region; the grating line has different heights perpendicular to the plane and/or has different refractive indices in the first region and the second region.

15. The diffractive optical waveguide of claim 1, wherein the period of the periodic structure in the first direction is within 100-500 nm.

16. The diffractive optical waveguide of claim 5, wherein the period of the periodic structure in the first direction is within 100-500 nm.

17. A display device, comprising the diffractive optical waveguide of claim 1.

18. The display device of claim 17, wherein the display device is a near-eye display device and comprises a lens and a frame for holding the lens close to the eye, the lens comprising the diffraction optical guide.

19. The display device of claim 18, wherein the display device is an augmented reality display device or a virtual reality display device.

* * * * *